United States Patent [19]
Furlani et al.

[11] Patent Number: 6,014,257
[45] Date of Patent: Jan. 11, 2000

[54] LIGHT MODULATOR

[75] Inventors: Edward P. Furlani, Lancaster; Syamal K. Ghosh; Dilip K. Chatterjee, both of Rochester, all of N.Y.

[73] Assignee: Eastman Kodak Company, Rochester, N.Y.

[21] Appl. No.: 09/173,072

[22] Filed: Oct. 14, 1998

[51] Int. Cl.[7] .................. G02B 5/18; G02B 26/08
[52] U.S. Cl. .................. 359/573; 359/298; 359/572; 359/578; 359/579
[58] Field of Search .................. 359/558, 566, 359/572, 573, 584, 589, 578, 291, 295

[56] References Cited

U.S. PATENT DOCUMENTS

| | | | |
|---|---|---|---|
| 3,752,563 | 8/1973 | Torok et al. | 359/573 |
| 3,861,784 | 1/1975 | Torok | 359/573 |
| 4,398,798 | 8/1983 | Krawczak et al. | 359/573 |
| 4,435,041 | 3/1984 | Torok et al. | 359/573 |
| 5,311,360 | 5/1994 | Bloom et al. | 359/572 |
| 5,606,447 | 2/1997 | Asada et al. | 359/199 |
| 5,673,139 | 9/1997 | Johnson | 359/291 |
| 5,677,783 | 10/1997 | Bloom et al. | 359/224 |
| 5,757,536 | 5/1998 | Ricco et al. | 359/224 |
| 5,793,519 | 8/1998 | Furlani et al. | 359/291 |
| 5,847,859 | 12/1998 | Murata | 359/201 |
| 5,898,515 | 4/1999 | Furlani et al. | 359/290 |
| 5,910,856 | 6/1999 | Ghosh et al. | 359/291 |
| 5,912,608 | 6/1999 | Asada | 335/222 |
| 5,914,801 | 6/1999 | Dhuler et al. | 259/230 |

OTHER PUBLICATIONS

R. H. Victora, et al., "Structure and Micromagnetic Predictions for Hysteretic Phenomena in a Novel Co–Pt Permanent Magnetic Thin Film," 1991 vol. 97, pp. 343–352.

*Primary Examiner*—Georgia Epps
*Assistant Examiner*—Margaret Burke
*Attorney, Agent, or Firm*—Clyde E. Bailey, Sr.

[57] ABSTRACT

A modulator (10) for modulating an incident beam of light includes a substrate (14) having a cavity (32) formed therein and a plurality of spaced-apart deformable elements (12) formed in the cavity (32). The deformable elements (12) each has a base layer (16), a poled magnetic layer (18) formed in the base layer (16) and a first light reflection layer (20) deposited on the magnetic layer (18) for reflecting an incident beam of light. Between adjacent deformable elements on the base (12) of the cavity (32) is arranged a second light reflection layer (36). A conductive element (22, 24) formed in the substrate (14) electro-magnetically energizes the deformable elements (12) to deflect in the cavity (32). Incident light passing through each one of the first light reflection layers (20) is caused to destructively interfere with light reflected from the second light reflection layers (36) thereby causing modulation of the incident light.

6 Claims, 3 Drawing Sheets

LIGHT MODULATOR

FIELD OF THE INVENTION

This invention relates to an apparatus for modulating a beam of light. More particularly, this invention describes a substantially flat reflective surface having selectively deformable elements for providing a diffraction grating.

BACKGROUND OF THE INVENTION

Advances in micromachining technology have given rise to a variety of Micro-electromechanical systems (MEMS) including light modulators for low cost display applications. Such modulators provide high-resolution, high operating speeds (KHz frame rates), multiple gray scale levels, color adaptability, high contrast ratio, and compatibility with VLSI technology. One such modulator has been disclosed in U.S. Pat. No. 5,311,360, titled "Method and Apparatus for Modulating a Light Beam" issued May 10, 1994, by Bloom et al. This modulator is a micromachined reflective phase grating. It consists of a plurality of equally spaced deformable elements in the form of beams suspended at both ends above a substrate thereby forming a grating. The deformable elements have a metallic layer that serves both as an electrode and as reflective surface for incident light. The substrate is also reflective and contains a separate electrode. The deformable elements are designed to have a thickness equal to $\lambda/4$ where $\lambda$ is the wavelength of the incident light source. They are supported a distance of $\lambda/4$ above, and parallel to, the substrate. Thus, when the deformable elements are unactivated, i.e., undeflected, the distance between their top surface and the substrate equals $\lambda/2$. Thus, when light impinges perpendicularly to the surface of this surface the grating reflects light as a flat mirror. However, when a sufficient voltage (switching voltage) is applied between the deformable elements and the substrate, the resulting electrostatic force pulls a portion of the deformable elements down a distance $\lambda/4$ toward the substrate, thereby reducing the distance between the top of this portion of the elements and the substrate to $\lambda/4$. Thus, light reflected from this portion of the deformable elements is out of phase with that from the substrate and a diffraction pattern is formed. Optical systems can intercept the diffracted light with output occurring only when the deformable elements are activated (i.e., pulled down). For display applications, a number of deformable elements are grouped for simultaneous activation thereby defining a pixel, and arrays of such pixels are used to form an image.

U.S. Pat. No. 5,677,783 titled "Method of Making a Deformable Grating Apparatus for Modulating a Light Beam and Including Means for Obviating Stiction Between Grating Elements and Underlying Substrate," issued Oct. 14, 1997, by Bloom et al. discloses a modulator which obviate stiction between grating elements and underlying substrate. One problem with the prior art modulator is that it is activated via an electrostatic force which is nonlinear. Specifically, as the voltage applied to the modulator increases from zero, the activated deformable elements deflect incrementally until they reach approximately ⅓ of their full scale deflection, and then they jump the remaining distance until they impact the substrate. Therefore, when the prior art modulator modulates light, the activated deformable elements contact the substrate and this gives rise to significant stiction problems.

Therefore, a need exists for a modulator in which the deformable elements can be held stationary at any point over the entire range of their motion so that light modulation can occur without the deformable elements contacting the substrate thereby eliminating the stiction problem.

SUMMARY OF THE INVENTION

It is, therefore, an object of the present invention to provide a modulator for modulating an incident beam of light by providing a deformable structure which can effectively move the desired $\lambda/4$ distance.

The object is achieved in a modulator for modulating an incident beam of light, comprising:

a substrate comprising a cavity having a base and side walls surrounding said base;

a plurality of equally spaced apart, deformable elements having opposing end edges integrally formed in said side walls of said substrate just above said cavity, wherein each one of said plurality of deformable elements comprises a base layer having a recess, a poled magnetic layer disposed in said recess, and a first light reflection layer deposited on said magnetic layer for reflecting said incident beam of light;

at least one conductive element arranged substantially lengthwise in said one of side walls surrounding said cavity in an electro-magnetic relationship to said magnetic layer of said plurality of equally spaced apart deformable elements;

a plurality of second light reflection layers arranged on the base of said cavity, a single one of said plurality of second light reflection layers being arranged between nearest adjacent spaced apart deformable elements; and means for applying a current through the said conductive element, said current producing a magnetic field in the deformable element which causes said deformable elements to deflect towards said cavity such that light reflecting from said plurality of first light reflection layers destructively interferes with light reflected from said plurality of second light reflection layers thereby causing modulation of said incident light.

An advantage of the light modulator of the invention is that its deformable elements can be deflected over the entire range of their possible motion thereby to accommodating a range of incident wavelengths.

DETAILED DESCRIPTION OF THE INVENTION

Figure 1:
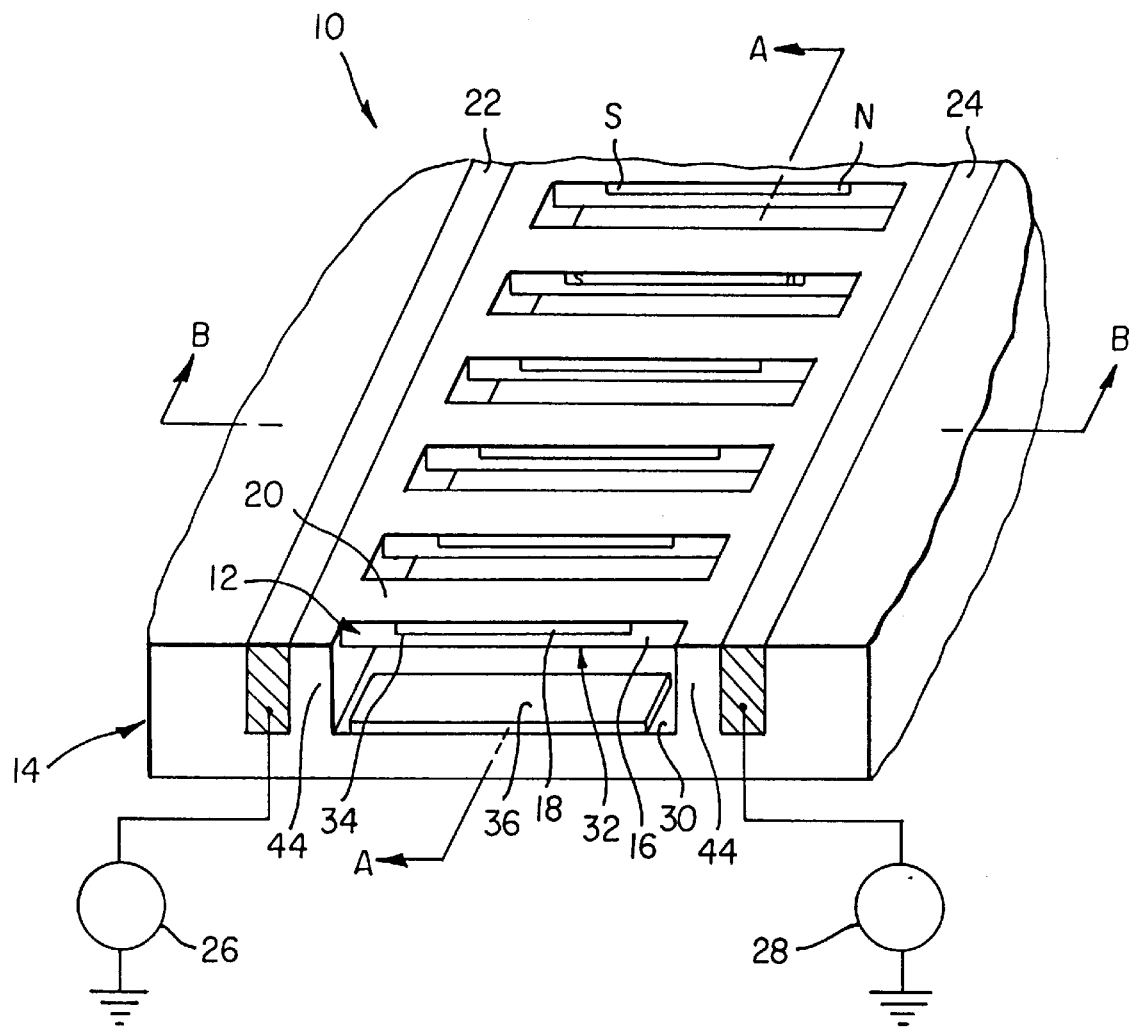
FIG. 1 is a perspective, partially cut-away view of a modulator of the invention.
Figure 2:
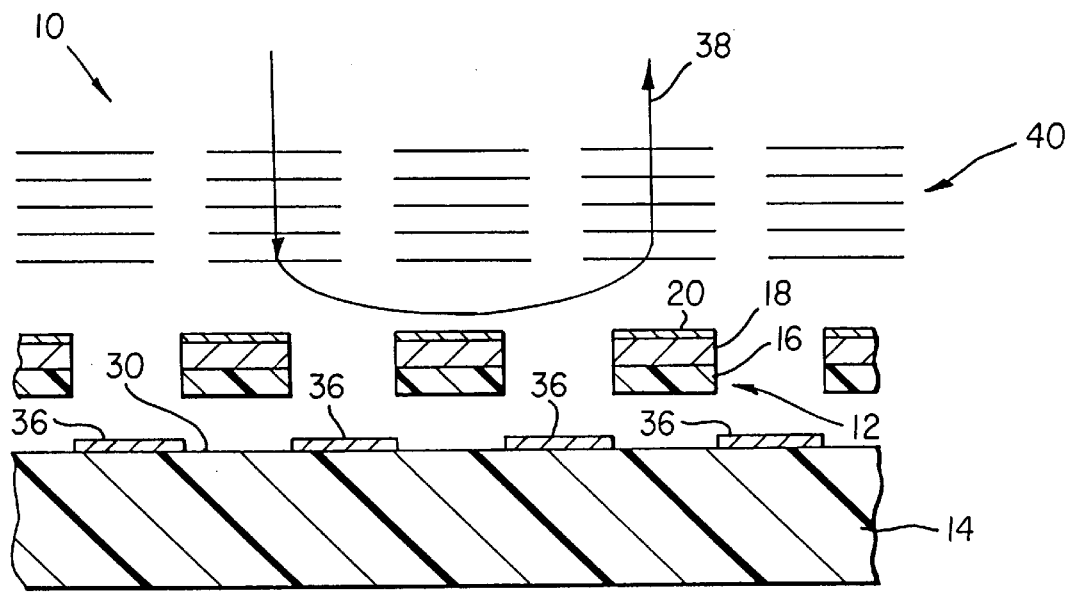
FIG. 2 is sectional view of the modulator of FIG. 1 taken along line A—A of FIG. 1 wherein the deformable elements are in the up position.
Figure 3:
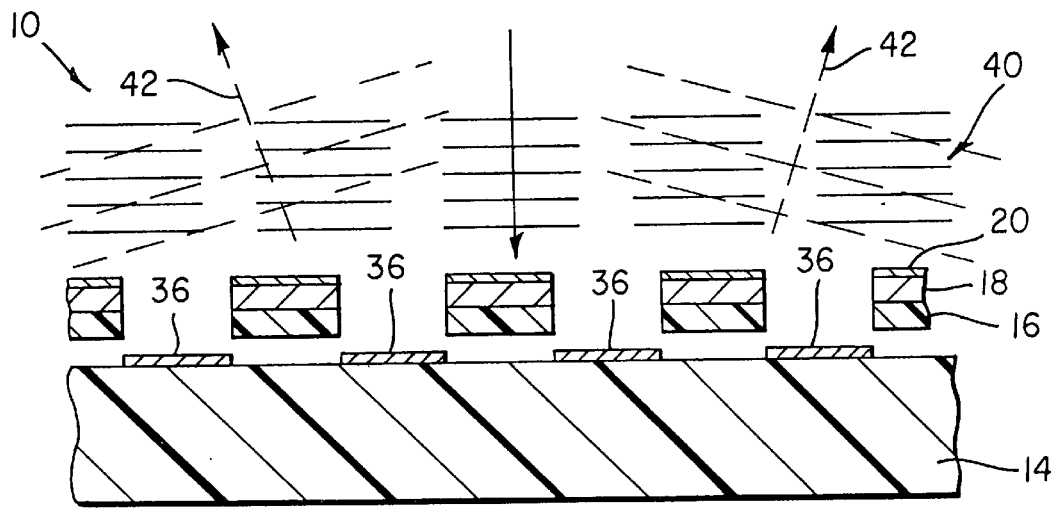
FIG. 3 is sectional view of the modulator of FIG. 1 taken along line A—A of FIG. 1 wherein the deformable elements are in the down position.

Referring to FIGS. 1, 2, and 3 perspective, partially cut-away and sectional views of a light modulator 10 of the invention are shown. The light modulator 10 comprises a plurality of equally spaced deformable elements 12 in the form of beams. The substrate 14 has a cavity 32 that has a base 30 and side walls 44, and the deformable elements 12 are supported at both ends above the cavity 32 with both ends integrally formed in the side walls 44. The deformable elements 12 comprise a base layer 16, preferably silicon nitride, having a recess 34, a layer of hard magnetic material 18 is deposited in the recess 34, and a first light reflection layer 20, preferable aluminum, is deposited on the top of the layer of hard magnetic material 18, as shown. The layer of hard magnetic material 18 is preferably made from cobalt-platinum (Co—Pt) which is deposited for in plane polarization at room temperature using dc or rf magnetron sputtering as described in the publication entitled "Structure and Micromagnetic Predictions for Hysteretic Phenomena in a Novel Co—Pt Permanent Magnetic Thin Film," by R. H. Victora, et al. in Journal of Magnetism and Magnetic Materials, Vol. 97, 1991, pp. 343–352. The layer of hard magnetic material 18 is polarized along its length (see FIG. 4). There are conductive elements 22 and 24 arranged in the side walls 44 on substrate 14 in proximity to the plurality of deformable elements 12 as shown. The conductive elements 22 and 24 are connected to power sources 26 and 28, respectively. There is a plurality of second light reflection layers 36, one each being arranged on the base 30 of the cavity 32 between the spaced apart deformable elements 12 as shown.

In FIG. 2 the modulator 10 is shown in a sectional view taken along line A—A in FIG. 1. The modulator 10 is shown with the power sources 26 and 28 off so that there is no current flowing through conductive elements 22 and 24. When no current flows through conductive elements 22 and 24, the deformable elements 12 are flat (i.e., in an up position) due to the inherent residual tensile stress therein. The modulator is designed so that when a light wave 40 of wavelength λ impinges perpendicularly to the surface of the modulator 10, the light reflected from the first light reflection layer 20 on the deformable elements 12 is in phase with the light reflected from the plurality of second light reflection layers 36 on the base 30 of the cavity 32 between the deformable elements 12 and consequently, the modulator 10 reflects light as a flat mirror as indicated by arrow 38.

In FIG. 3 the modulator 10 is shown in a sectional view taken along line A—A in FIG. 1. The power sources 26 and 28 are turned on thereby causing currents to flow in conductive elements 22 and 24 as will be described. The applied currents gives rise to magnetic fields that impart a Lorentz force to the magnetic poles in the layer of hard magnetic material 18 in the deformable elements 12 which is sufficient to bend the deformable elements 12 downward until the midportion of the deformable elements 12 deflects a distance λ/4 downward (see FIG. 5). Thus, when a lightwave 40 of wavelength λ impinges perpendicularly to the surface of the modulator 10, the light reflected from the first light reflection layer 20 on the deformable elements 12 is out of phase with the light reflected from the plurality of second light reflection layers 36 on the base 30 of the cavity 32 between the deformable elements 12 and the modulator 10 diffracts the incident light in directions indicated by arrows 42. Optical systems can be designed to intercept the diffracted light with output occurring only when the deformable elements 12 are activated. For display applications, a group of deformable elements 12 can be simultaneously activated to form a pixel, and arrays of such pixels can be fabricated for displaying an image.

Figure 4:
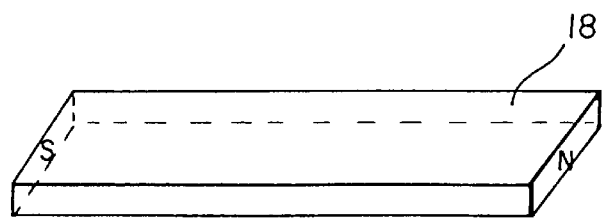
FIG. 4 is perspective view of a layer of hard magnetic material which has been polarized along its length.

Referring to FIG. 4, a perspective view is shown of a polarized layer of hard magnetic material 18 in isolation.

Figure 5:
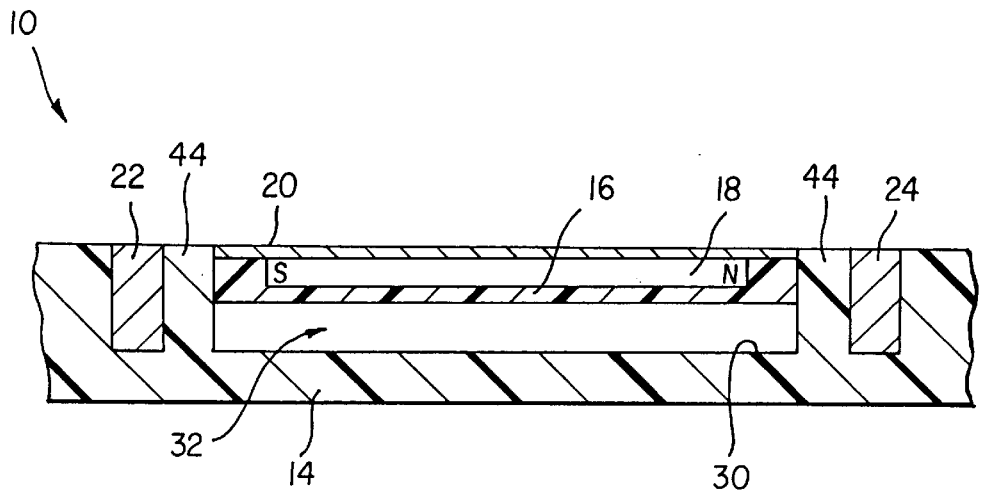
FIG. 5 is sectional view of the modulator of FIG. 1 taken along line B—B of FIG. 1 wherein the deformable elements are in the up position.

Referring to FIG. 5, a sectional view is shown of the modulator 10 taken along line B—B of FIG. 1, wherein the deformable elements 12 are in an unactivated up position (i.e., power sources 26 and 28 are off).

Figure 6:
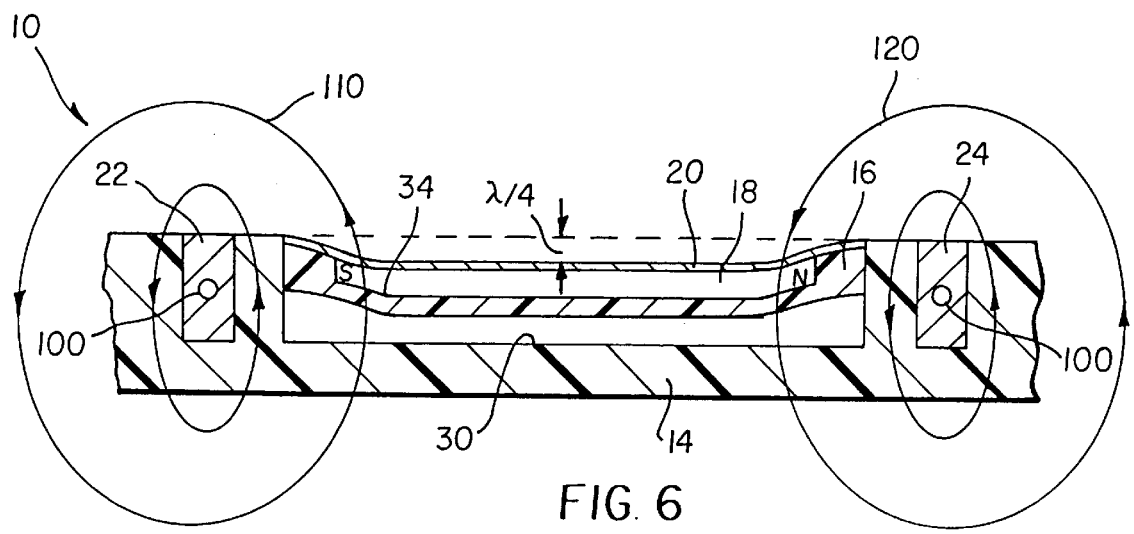
FIG. 6 is sectional view of the modulator of FIG. 1 taken along line B—B of FIG. 1 wherein the deformable elements are in the down position.

Referring to FIG. 6, a sectional view is shown of the modulator 10 taken along line B—B of FIG. 1, wherein the deformable elements 12 are in an activated down position, i.e., power sources 26 and 28 are turned on. Specifically, to activate the deformable elements 12, the power sources 26 and 28 cause currents to flow through conductive elements 22 and 24, in a direction out of the paper as indicated by current arrows tips 100 as is well known. The current flowing through the conductive element 22 gives rise to a magnetic field indicated by field line 110 which imparts a downward Lorentz force to the south pole of the layer of hard magnetic material 18. The current flowing through the conductive element 24 gives rise to a magnetic field indicated by field line 120 which imparts a downward Lorentz force to the north pole of the layer of hard magnetic material 18. The currents in conductive elements 22 and 24 are of sufficient magnitude to deflect the midportion of the deformable elements 12 downward a distance λ/4 as shown. It is instructive to note that the deformable elements 12 can be held stationary at this deflected distance as long as the currents in conductive elements 22 and 24 remain constant. It is important to note that the activated deformable elements 12 obtain λ/4 the desired deflection over a limited portion of their midsection due to the fact that deformable elements 12 are rigidly supported at both ends. When a lightwave 40 of wavelength λ impinges perpendicularly to the surface of the modulator 10 when the deformable elements 12 are activated in this fashion, the light reflected from the first light reflection layer 20 on the midportion of the deformable elements 12 that is deflected downward a distance λ/4 is in out of phase with the light reflected from the plurality of second light reflection layers 36 on the base 30 in the cavity 32 between the deformable elements 12 and the modulator 10 diffracts the incident light as described above.

The invention has been described in detail with particular reference to certain preferred embodiments thereof, but it will be understood that variations and modifications can be effected within the spirit and scope of the invention.

| PARTS LIST | |
|---|---|
| 10 | light modulator |
| 12 | deformable element |
| 14 | substrate |
| 16 | base layer |
| 18 | layer of hard magnetic material |
| 20 | first light reflection layer |
| 22 | conductive element |
| 24 | conductive element |
| 26 | power source |
| 28 | power source |
| 30 | base of cavity |
| 32 | cavity |
| 34 | recess |
| 36 | second light reflection layer |
| 38 | light direction arrow |
| 40 | light wave |
| 42 | light direction arrow |
| 44 | side walls |
| 100 | tip of current arrow |
| 110 | magnetic field line |
| 120 | magnetic field line |

What is claimed is:

1. A modulator for modulating an incident beam of light, comprising:

a substrate comprising a cavity having a base and side walls surrounding said base;

a plurality of equally spaced apart, deformable elements having opposing end edges integrally formed in said side walls of said substrate just above said cavity, wherein each one of said plurality of deformable elements comprises a base layer having a recess, a poled magnetic layer disposed in said recess, and a first light reflection layer deposited on said magnetic layer for reflecting said incident beam of light;

at least one conductive element arranged substantially lengthwise in one of said side walls surrounding said cavity in an electromagnetic relationship to said magnetic layer of said plurality of equally spaced apart deformable elements;

a plurality of second light reflection layers arranged on the base of said a cavity, a single one of said plurality of second light reflection layers being arranged between nearest adjacent spaced apart deformable elements; and means for applying a current through said conductive element, said current producing a magnetic field in the deformable element which causes said deformable elements to deflect towards said cavity such that light reflecting from said plurality of first light reflection layers destructively interferes with light reflected from said plurality of second light reflection layers thereby causing modulation of said incident light.

2. The modulator of claim 1 wherein said first reflection layer comprises materials selected from the group consisting of: (a) aluminum, (b) copper, (c) gold, (d) silver, and, (e) alloys thereof.

3. The modulator of claim 1 wherein said conductive element comprises materials selected from the group consisting of (a) aluminum, (b) copper, (c) gold, (d) silver, and, (e) alloys thereof.

4. The modulator of claim 1 wherein said poled magnetic layer is made from cobalt-platinum.

5. The modulator of claim 1 wherein said base layer is made from silicon dioxide.

6. The modulator of claim 1 wherein said base layer is made from silicon nitride.

* * * * *